United States Patent
Dai et al.

(10) Patent No.: US 8,453,244 B2
(45) Date of Patent: *May 28, 2013

(54) SERVER, USER DEVICE AND MALWARE DETECTION METHOD THEREOF

(75) Inventors: Shih-Yao Dai, Taipei (TW); Yu-Chen Chang, Taipei (TW); Jain-Shing Wu, Taipei (TW); Jui-Fa Chen, Danshui Township, Taipei County (TW); Sy-Yen Kuo, Taipei (TW)

(73) Assignee: Institute for Information Industry, Taipei (TW)

( * ) Notice: Subject to any disclaimer, the term of this patent is extended or adjusted under 35 U.S.C. 154(b) by 239 days.

This patent is subject to a terminal disclaimer.

(21) Appl. No.: 12/968,735

(22) Filed: Dec. 15, 2010

(65) Prior Publication Data

US 2012/0131675 A1 May 24, 2012

(30) Foreign Application Priority Data

Nov. 19, 2010 (TW) .................................. 99139906 A

(51) Int. Cl.
*G06F 11/00* (2006.01)
*G06F 11/30* (2006.01)

(52) U.S. Cl.
USPC ................. 726/24; 726/23; 726/25; 713/187; 713/188

(58) Field of Classification Search
USPC .................... 726/24, 23, 25; 713/187, 188
See application file for complete search history.

(56) References Cited

U.S. PATENT DOCUMENTS

| 7,028,338 | B1 * | 4/2006 | Norris et al. ..................... 726/23 |
| 7,257,841 | B2 * | 8/2007 | Naitoh ............................. 726/24 |
| 7,520,728 | B2 * | 4/2009 | Sleiman et al. ........... 416/223 R |
| 2004/0064736 | A1 * | 4/2004 | Obrecht et al. ............... 713/201 |
| 2005/0027686 | A1 * | 2/2005 | Shipp ................................ 707/3 |
| 2007/0271422 | A1 * | 11/2007 | Osaki ............................. 711/154 |
| 2009/0157574 | A1 * | 6/2009 | Lee ................................. 706/12 |
| 2009/0199296 | A1 | 8/2009 | Xie et al. |
| 2010/0031361 | A1 | 2/2010 | Shukla |

FOREIGN PATENT DOCUMENTS

GB 2466908 A 7/2010
WO 2007003916 A2 1/2007

OTHER PUBLICATIONS

Combined Search and Examination Report of application No. GB1100039.5 mailed Apr. 20, 2011.

* cited by examiner

*Primary Examiner* — Mohammad W Reza
(74) *Attorney, Agent, or Firm* — Ping Wang; Andrews Kurth LLP

(57) ABSTRACT

A server, a user device, and a malware detection method thereof are provided. The server connects with the user device via a network, and records execution records of the user device. Based on the history of the execution records of the user device, the server can detect whether the user device has malwares or not accordingly.

8 Claims, 16 Drawing Sheets

SERVER, USER DEVICE AND MALWARE DETECTION METHOD THEREOF

This application claims priority to Taiwan Patent Application No. 099139906 filed on Nov. 19, 2010, which is hereby incorporated by reference in its entirety.

FIELD

The present invention relates to a server, a user device and a malware detection method thereof. More particularly, according to the server, the user device and the malware detection method thereof of the present invention, by having the server record execution records of the user device, whether a malware exists in the user device can be detected.

BACKGROUND

Nowadays, antivirus software is widely used to detect virus programs for purpose of information security protection. More specifically, to avoid information from being stolen or ruined, computers are generally installed with antivirus software which has a virus database. The virus database is configured to record signatures of virus programs that are currently known. Thus, the antivirus software can detect files in a computer one by one by comparing the signatures of viruses with those of the files. If, according to the comparison result, a file is found to have the same signature as that of a virus, then the file is determined as a virus program.

However, with rapid and wide spread of the virus programs, updating of virus program signatures in virus databases of the antivirus software becomes inadequate to deal with the flooding virus programs. In other words, whether antivirus software is able to detect a virus program depends on comparison with a virus database, so if the virus database fails to obtain a signature of a new virus program in real time, a false determination would result from the comparison. On the other hand, as the volume of signatures stored in the virus database is expanding increasingly with the number of virus programs, continuous extension of the virus database on a general home computer or personal mobile device would lead to a lower operating speed or impose a burden on a device that has a small storage capacity.

In view of this, the so-called cloud computing has been adopted by some existing antivirus software. According to this solution, a virus database is stored in a remote server that has a strong computing power and a large storage capacity, and the server detects virus programs in terminals through a network connection. However, although this may alleviate the burden on the terminals, the problem that signature updating of the virus database falls much behind growth of virus programs still exists with this solution because detection of virus programs is still based on signatures stored in the virus database. Therefore, there is still a high risk of false determination regardless of whether the antivirus software uses a local virus database or a remote virus database for detection of virus programs, thus causing serious loopholes in terms of information security.

Accordingly, it is highly desirable in the art to provide a solution that can efficiently and completely detect virus programs in real time.

SUMMARY

To overcome the aforesaid problem of insufficient information security protection capability, the objective of the present invention is to provide a server, a user device and a malware detection method thereof. According to the present invention, by having the server record execution records of the user device, whether the user device has a suspicious behavior or not can be determined so as to decide a necessary measure to be subsequently taken for security protection.

To achieve the aforesaid objective, the present invention provides a malware detection method for a server. The server connects to a first user device via a network. The malware detection method comprises the following steps of: (a) enabling the server to receive at least one first execution record from a client module of the first user device; (b) enabling the server to store the at least one first execution record of the first user device into a recording list; and (c) enabling the server to determine that a malware exists in the first user device according to the recording list, and transmit a malware notice to the first user device.

To achieve the aforesaid objective, the present invention further provides a server for detecting a malware. The server connects to a first user device via a network. The server comprises a transceiver, a memory and a processing unit. The transceiver is configured to receive at least one first execution record from a client module of the first user device. The memory is configured to store a recording list that is configured to record the at least one first execution record. The processing unit is configured to determine that a malware exists in the first user device according to the recording list and transmit a malware notice to the first user device via the transceiver.

To achieve the aforesaid objective, the present invention further provides a malware detection method for a user device. The user device connects to a server via a network. The malware detection method comprises the following steps of: (a) enabling a client module of the user device to transmit at least one execution record to the server; (b) enabling the client module of the user device to, after the step (a), receive a malware notice from the server, wherein the malware notice is used to notice that a malware exists in the user device.

To achieve the aforesaid objective, the present invention further provides a user device for detecting a malware. The user device connects to a server via a network. The user device comprises a transceiver and a client module. The client module is configured to transmit at least one execution record to the server via the transceiver and receive a malware notice from the server via the transceiver, wherein the malware notice is used to notice that a malware exists in the user device.

With the technical features disclosed above, the server of the present invention can record behavior patterns of the user device in real time and determine whether or not a malware exists in the user device accordingly. Moreover, according to the determination result, the server may further decide a necessary measure to be subsequently taken on the user device for information security protection.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the present invention will be explained with reference to embodiments thereof. However, these embodiments are not intended to limit the present invention to any specific environment, applications or particular implementations described in these embodiments. Therefore, description of these embodiments is only for purpose of illustration rather than to limit the present invention. It should be appreciated that, in the following embodiments and the attached drawings, elements not directly related to the present invention are omitted from depiction.

Figure 1A:
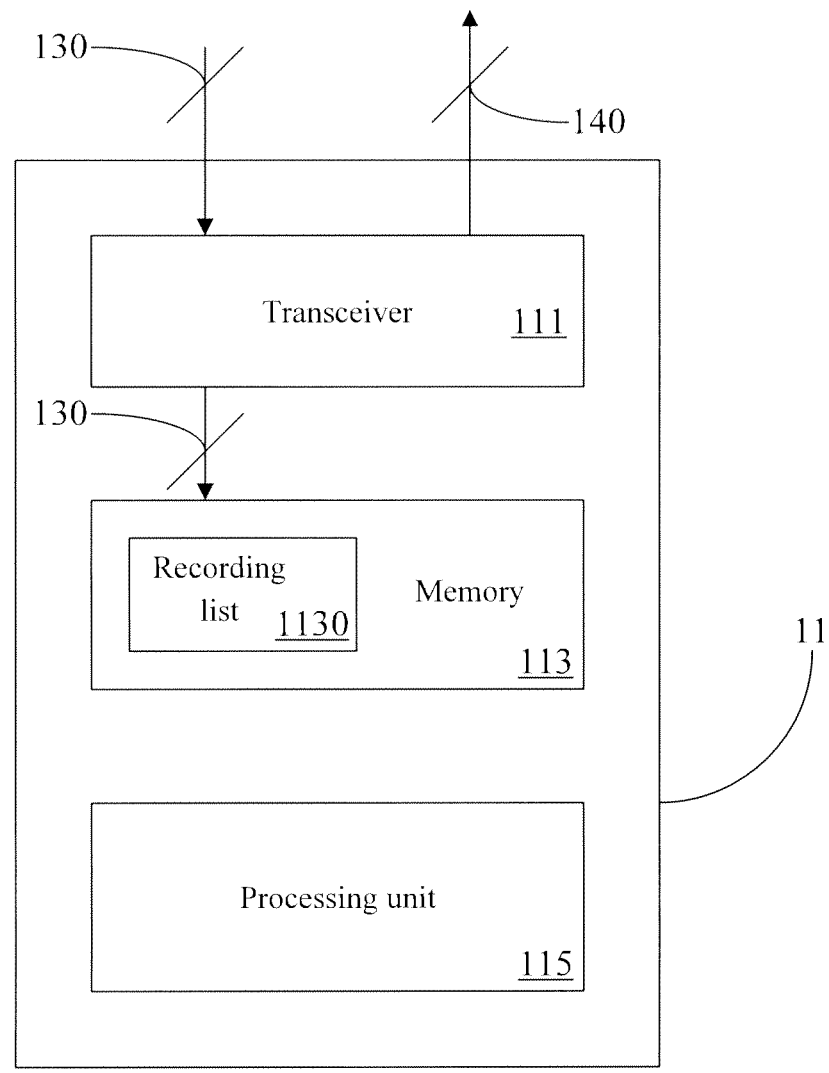
FIG. 1A is a schematic view of a server of a first embodiment of the present invention.
Figure 1B:
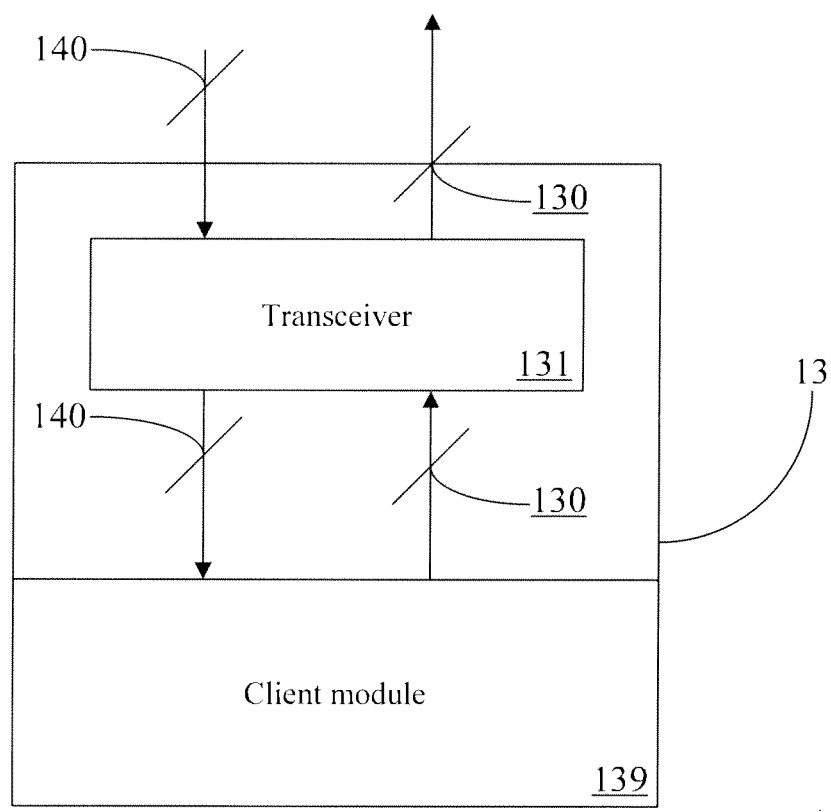
FIG. 1B is a schematic view of a first user device of the first embodiment of the present invention.

Firstly, referring to FIG. 1A and FIG. 1B, schematic views of a server 11 and a first user device 13 of a first embodiment of the present invention are shown therein respectively. The server 11 comprises a transceiver 111, a memory 113 having a recording list 1130 stored therein, and a processing unit 115. The first user device 13 comprises a transceiver 131 and a client module 139. It shall be particularly noted that, the client module 139 of the first user device 13 may be a system module installed at a lower level of the system which, through independent operation or by allowing read only operations, can be made to be virus free. Functions of and interactions between individual hardware modules of the server 11 and the first user device 13 will be detailed thereinafter.

Figure 1C:
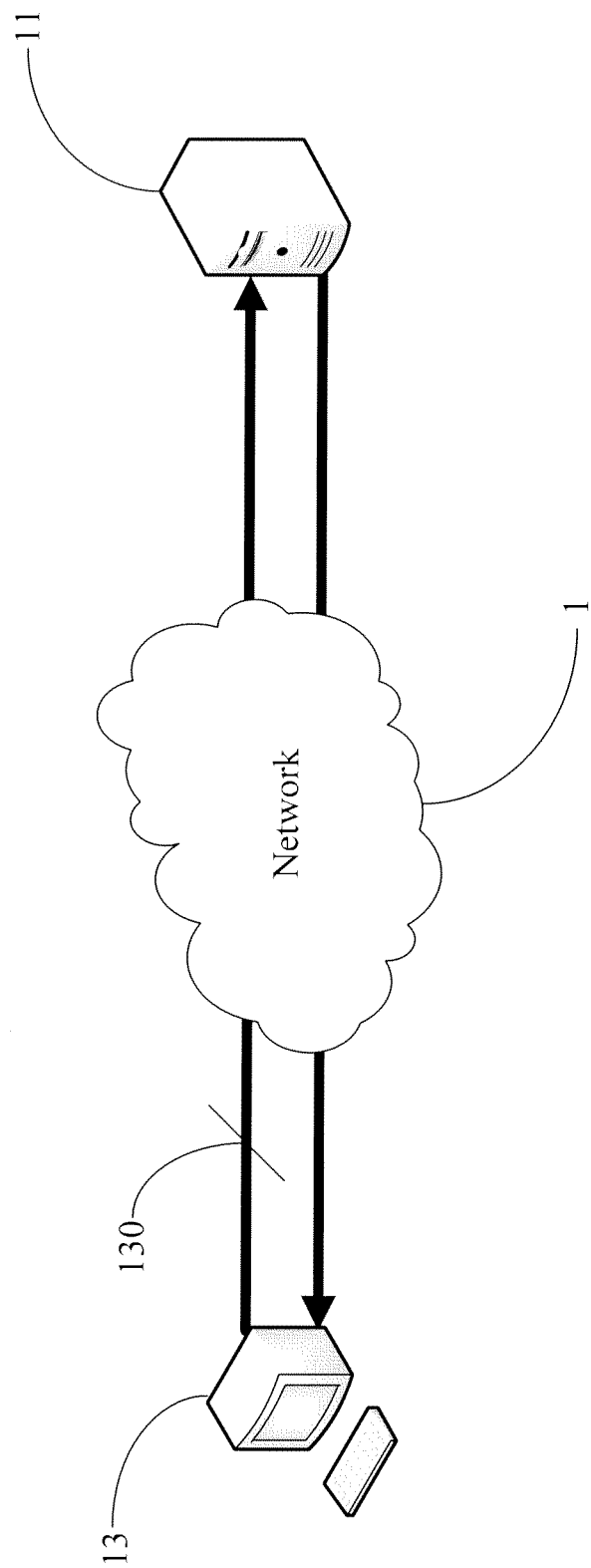
FIG. 1C is a schematic view illustrating network connections of the first embodiment of the present invention.

Referring to FIG. 1C at the same time, the server 11 connects to the first user device 13 via a network 1. It shall be emphasized that, connections between the server 11, the first user device 13 and the network 1 shown in FIG. 1C are only for purpose of schematic illustration, but not to limit the network environment of the present invention to merely a wireless network or merely a wired network. Firstly, the first user device 13 executes various operations in response to various programs under execution, and when the various operations are executed, execution records will be triggered. The execution records may be records of various forms of triggering behaviors, and in order for those of skilled in the art to better understand technical features of the present invention, execution records may be considered as system calls in the following embodiments; however, this is not intended to limit forms of the execution records.

Then, when the first user device 13 triggers at least one first execution record 130, the client module 139 of the first user device 13 transmits the at least one first execution record 130 to the server 11 via the transceiver 131. In other words, the transceiver 111 of the server 11 receives the at least one first execution record 130 from the client module 139 of the first user device 13. Then, the server 11 has the at least one first execution record 130 stored into the recording list 1130 of the memory 113. Afterwards, the processing unit 115 of the server 11 determines whether a malware (not shown) exists in the first user device 13 according to content recorded in the recording list 1130 of the memory 113, and transmits a malware notice 140 to the first user device 13 via the transceiver 111. Then, the malware notice 140 is received by the client module 139 of the first user device 13 from the server 11 via the transceiver 131. Here, the malware notice 140 is used to inform the first user device 13 of existence of the malware in the first user device 13.

In more detail, the processing unit 115 of the server 11 can, according to the at least one first execution record 130 recorded in the recording list 1130 of the memory 113, determine whether a system call represented by the at least one first execution record 130 is a reasonable behavior triggering. In other words, if the processing unit 115 determines that the system call represented by the at least one first execution record 130 is not a reasonable behavior triggering, then it means that the program that initiates the at least one first execution record 130 is a malware. Otherwise, if the processing unit 115 determines that the system call represented by the at least one first execution record 130 is a reasonable behavior triggering, then it means that currently the program that initiates the at least one first execution record 130 is not found to have a suspicious behavior.

It shall be particularly noted that, the primary concept of the present invention is to filter execution records of the user device by means of the server, so what described above is not intended to limit orders of recording the execution records and determining whether a malware exists in the user device or not. In more detail, taking the first embodiment as an example, when the transceiver 111 of the server 11 receives the at least one first execution record 130 from the client module 139 of the first user device 13, the processing unit 115 of the server 11 may also firstly determine whether the first user device 13 has an improper behavior according to content of the at least one first execution record 130 so as to determine that a malware exists in the first user device 13, and then transmit the malware notice 140 to the first user device 13. After completion of the determination, the server 11 has the at least one first execution record 130 stored into the recording list 1130 of the memory 113 for use in subsequent determinations.

According to what described above, by monitoring behaviors of the first user device 13 in real time, the server 11 disclosed in the present invention can determine whether a malware exists in the first user device 13 so that subsequent processing can be made by the server 11 for security protection. Ways in which the security protection is accomplished will be further described in the following embodiments.

Figure 2A:
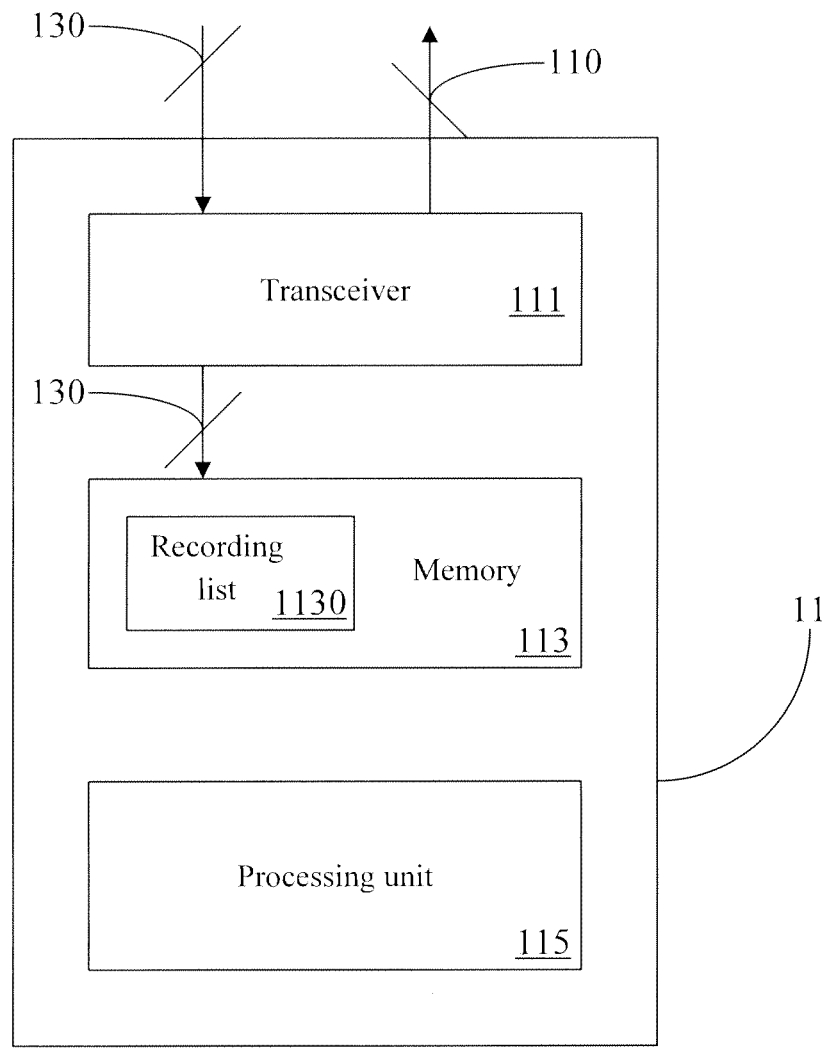
FIG. 2A is a schematic view of a server of a second embodiment of the present invention.
Figure 2B:
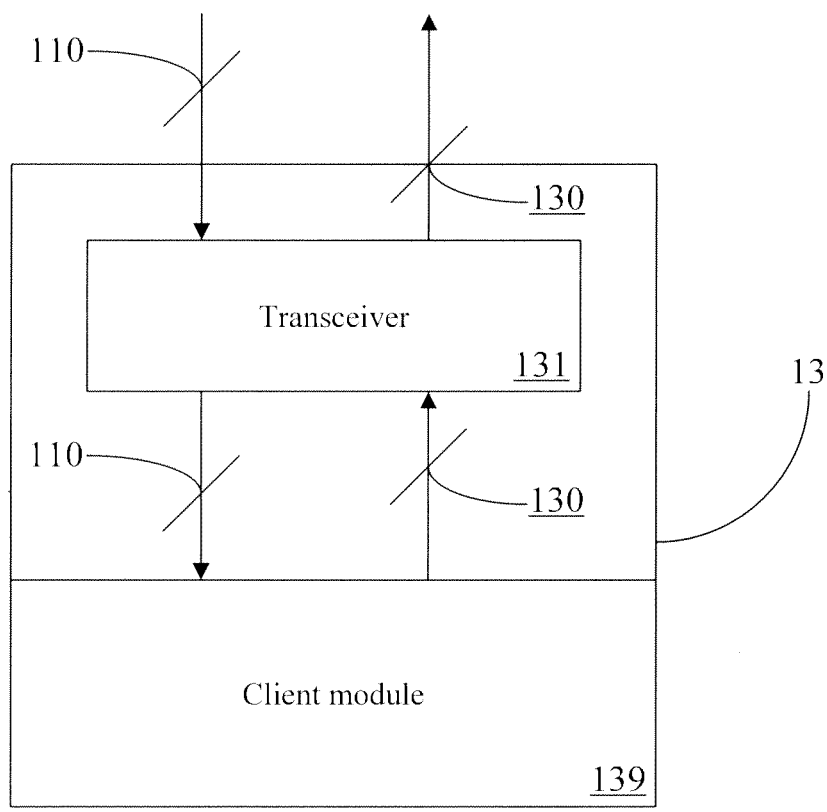
FIG. 2B is a schematic view of a first user device of the second embodiment of the present invention.
Figure 2C:
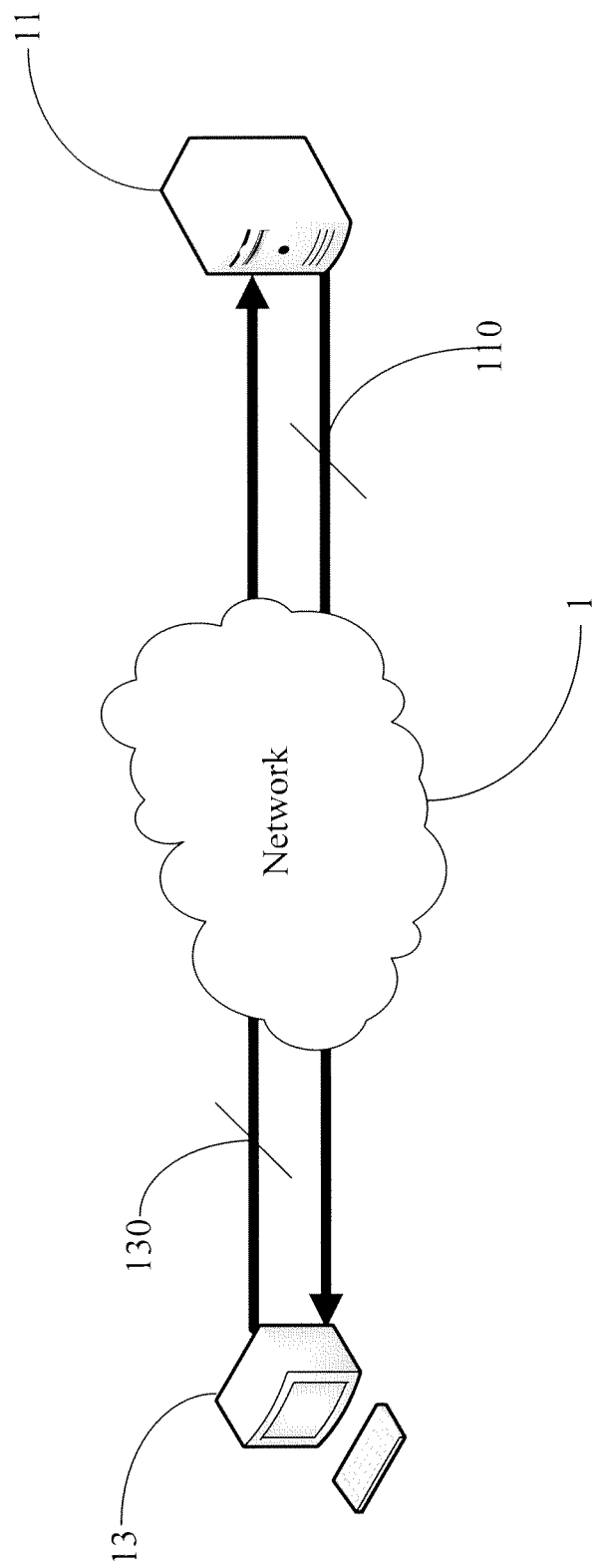
FIG. 2C is a schematic view illustrating network connections of the second embodiment of the present invention.

Referring next to FIG. 2A through FIG. 2C, schematic views of a second embodiment of the present invention are shown therein. It shall be noted firstly that, the way of detecting a malware in the second embodiment is the same as that of the first embodiment and elements bearing the same reference numerals also have the same functionality, so no further description will be made herein. Hereinafter, description of the second embodiment will focus on the subsequent security protection.

Specifically, in the second embodiment, when the server 11 determines that a malware exists in the first user device 13, the transceiver 111 of the server 11 will notify the client module 139 of the first user device 13 to remove the malware. More specifically, when the processing unit 115 of the server 11 determines that the malware exists in the first user device 13, the processing unit 115 of the server 11 will transmit a malware removal notice 110 to the client module 139 of the first user device 13 via the transceiver 111 so that the malware is removed by the client module 139 of the first user device 13.

In other words, the client module 139 of the first user device 13 receives the malware removal notice 110 from the server 11 via the transceiver 131. Then according to the malware removal notice 110, the client module 139 of the first user device 13 knows that the malware exists in the first user device 13 and further takes actions to remove the malware. Thus, in the way as described in the second embodiment, the malware existing in the first user device 13 can be removed by the client module 139 of the first user device 13 to ensure security of subsequent behaviors.

Figure 3A:
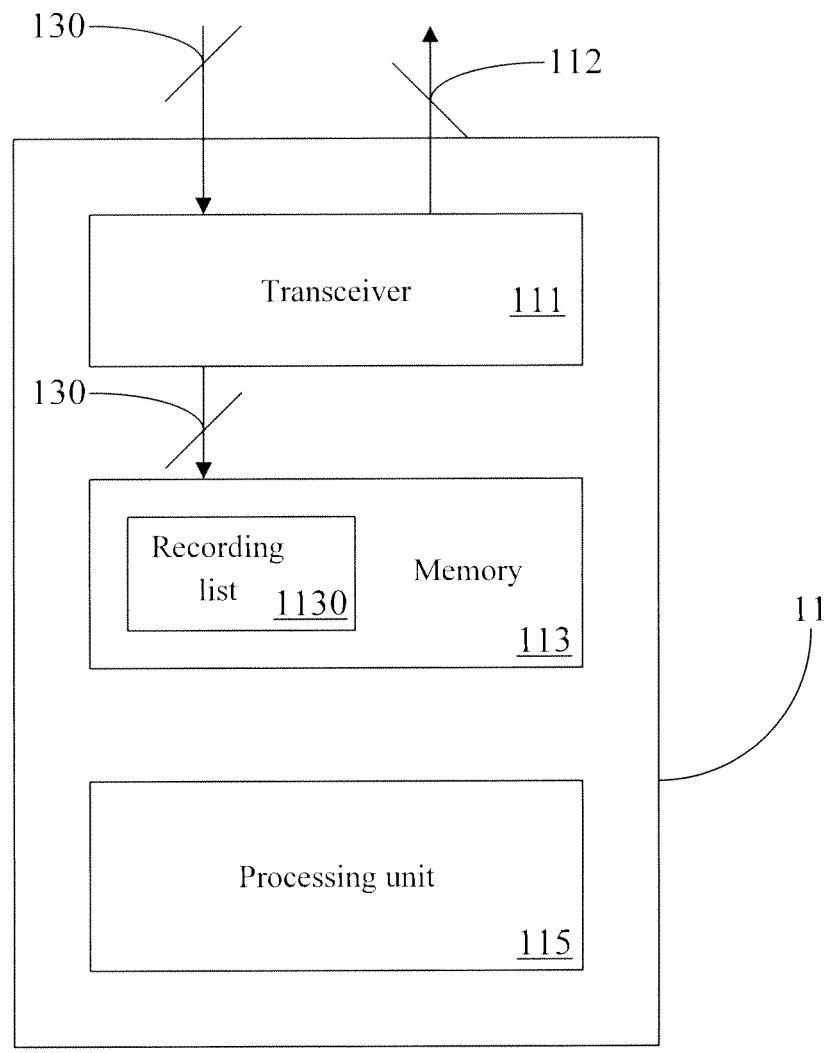
FIG. 3A is a schematic view of a server of a third embodiment of the present invention.
Figure 3B:
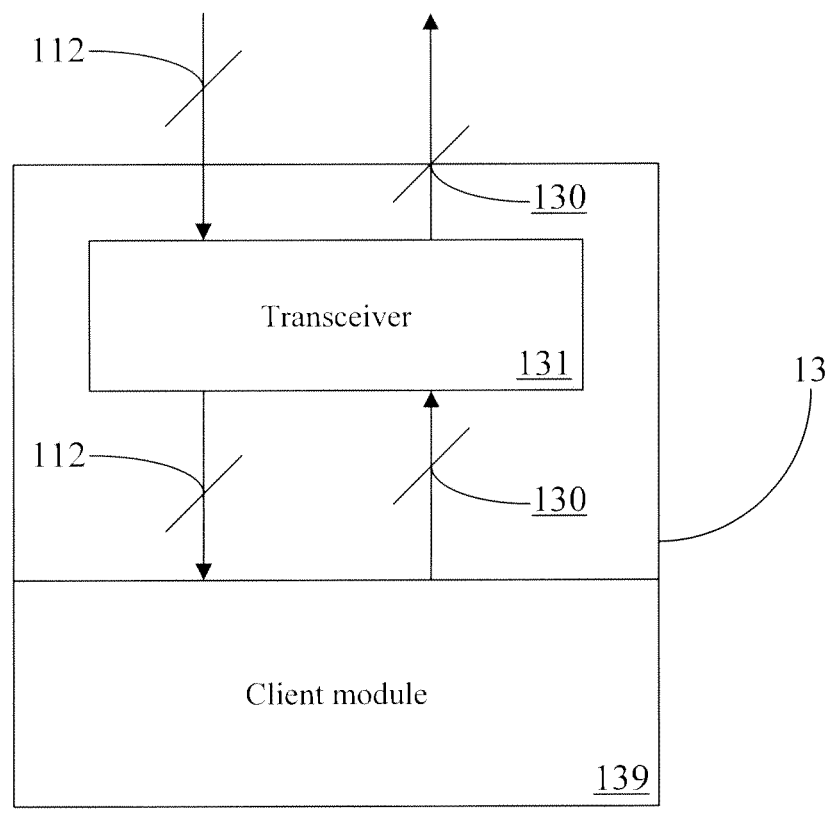
FIG. 3B is a schematic view of a first user device of the third embodiment of the present invention.
Figure 3C:
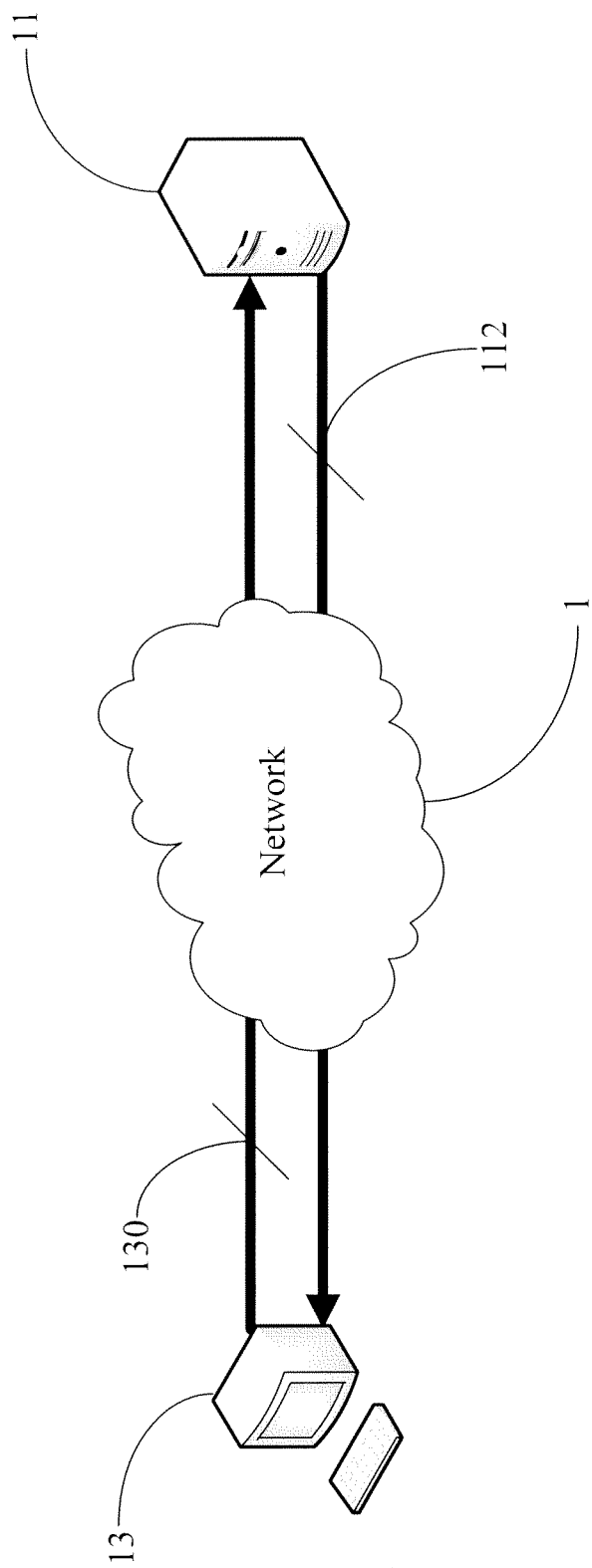
FIG. 3C is a schematic view illustrating network connections of the third embodiment of the present invention.

Referring next to FIG. 3A through FIG. 3C, schematic views of a third embodiment of the present invention are shown therein. It shall be noted firstly that, the way of detecting a malware in the third embodiment is the same as that of the first embodiment and elements bearing the same reference numerals also have the same functionality, so no further description will be made herein. Hereinafter, description of the third embodiment will focus on another way in which the subsequent security protection is accomplished.

Specifically, in the third embodiment, when the server 11 determines that a malware exists in the first user device 13, the processing unit 115 of the server 11 may, according to the recording list 1130 of the memory 113, further determine at least one malicious behavior executed by the malware in the first user device 13. In more detail, according to the at least one first execution record 130 recorded in the recording list 1130 of the memory 113, the processing unit 115 of the server 11 may further determine what kind of system calls has been made by the malware in the first user device 13 so as to decide the at least one malware.

Afterwards, the processing unit 115 of the server 11 transmits a malicious behavior notice 112 to the client module 139 of the first user device 13 via the transceiver 111 according to the at least one malicious action. In other words, the client module 139 of the first user device 13 receives the malicious behavior notice 112 from the server 11 via the transceiver 131. Thus, the client module 139 of the first user device 13 can know the at least one malicious action executed earlier on by the malware in the first user device 13 and perform a recovery procedure accordingly. For example, if the malware has stolen a piece of password information from the first user device 13, then from the malicious behavior notice 112, the client module 139 of the first user device 13 can know the password-stealing behavior of the malware so that the first user device 13 changes the password accordingly.

In the way described in the third embodiment, the first user device 13 can know about actions that have been made by the malware so as to perform a subsequent procedure for alteration or recovery accordingly.

Referring next to FIG. 4A through FIG. 4D, schematic views of a fourth embodiment of the present invention are shown therein. It shall be noted firstly that, the way of detecting a malware in the fourth embodiment is the same as that of the first embodiment and elements bearing the same reference numerals also have the same functionality, so no further description will be made herein. The fourth embodiment differs from the first embodiment in that, in the fourth embodiment, joint protection among a number of user devices can be accomplished by the server 11.

Figure 4A:
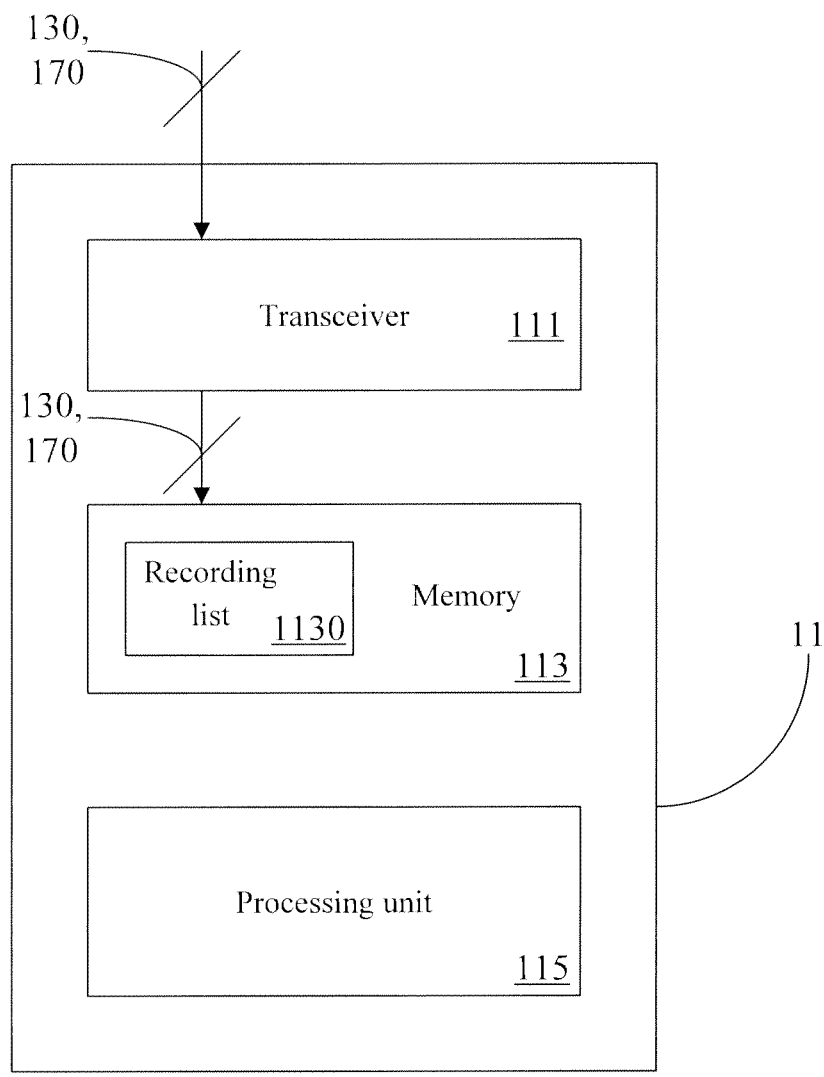
FIG. 4A is a schematic view of a server of a fourth embodiment of the present invention.
Figure 4B:
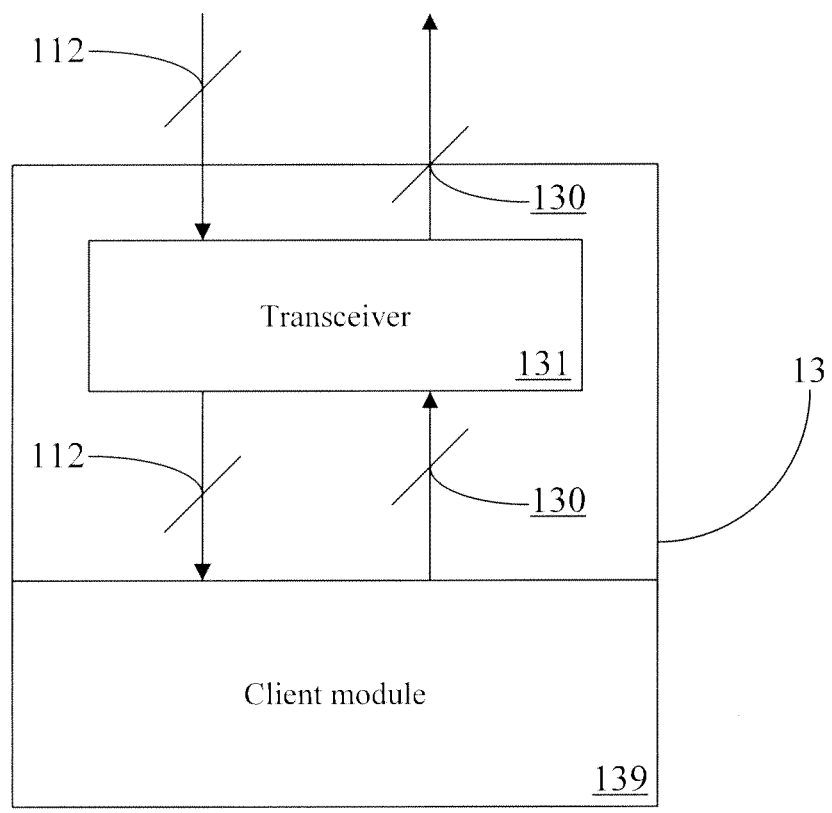
FIG. 4B is a schematic view of a first user device of the fourth embodiment of the present invention.
Figure 4C:
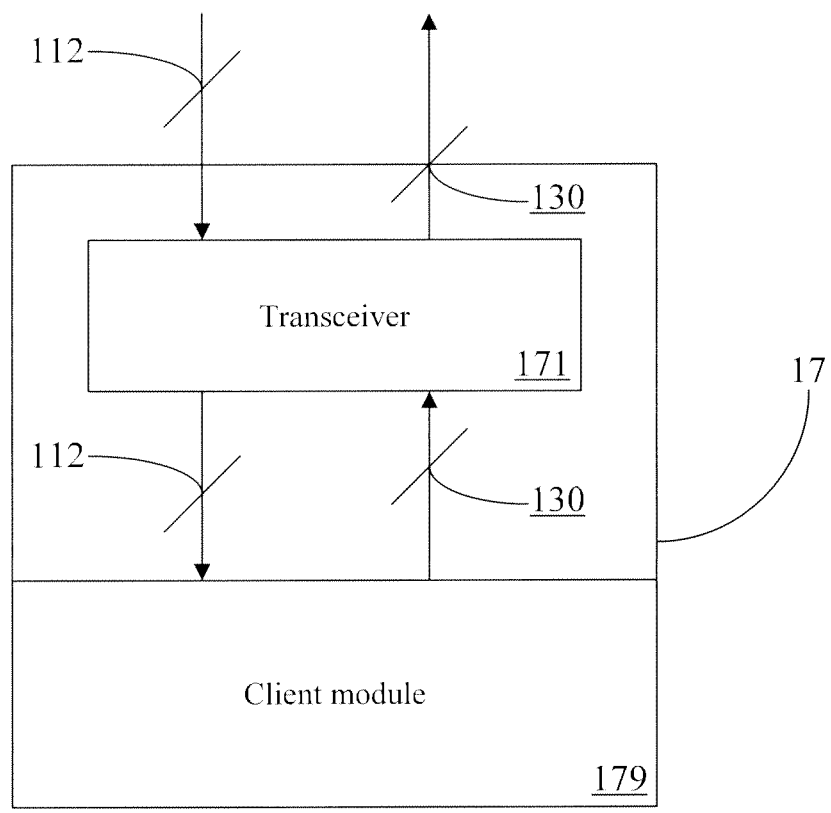
FIG. 4C is a schematic view of a second user device of the fourth embodiment of the present invention.
Figure 4D:
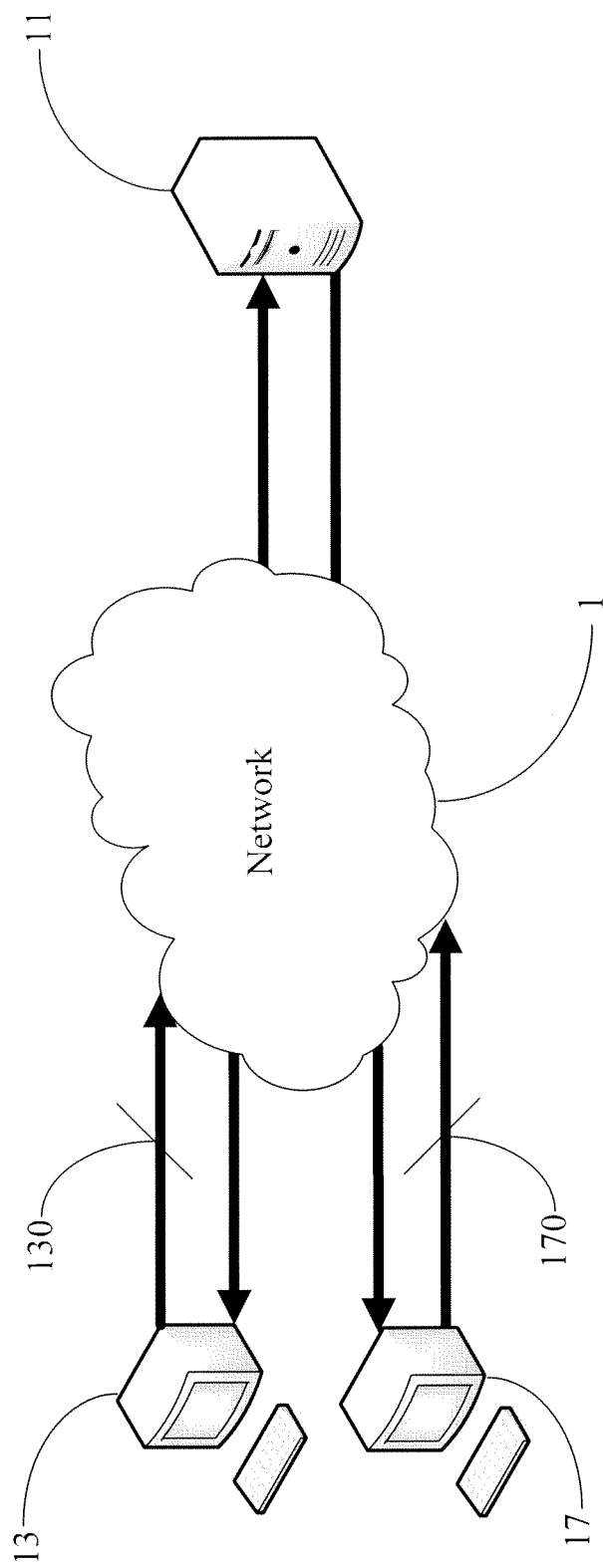
FIG. 4D is a flowchart of a service transmission method of the fourth embodiment of the present invention.

Referring firstly to FIG. 4C, a schematic view of a second user device 17 according to the fourth embodiment of the present invention is shown therein. The second user device 17 comprises a transceiver 171 and a client module 179. Similarly, the client module 179 of the second user device 17 is also a system module installed at a lower layer of the system which, through independent operation or by allowing only reading operations, can be made to be virus free. Referring next to FIG. 4D, the server 11 further connects to the second user device 17 via the network 1.

Like the first user device 13, the second user device 17 also triggers execution records when executing various actions. After the second user device 17 triggers at least one second execution record 170, the client module 179 of the second user device 17 transmits the at least one second execution record 170 to the server 11 via the transceiver 171. In other words, the transceiver 111 of the server 11 receives the at least one second execution record 170 from the client module 179 of the second user device 17. Then, the server 11 has the at least one second execution record 170 stored into the recording list 1130 of the memory 113.

Through what described above, the server 11 can determine whether the malware of the first user device 13 is copied to the second user device 17 according to the at least one first execution record 130 and the at least one second execution record 170 recorded in the recording list 1130 of the memory 113. In more detail, if the malware of the first user device 13 has initiated a triggering behavior of being copied to the second user device 17, it should have generated a system call for copying. In other words, the behavior of copying between the first user device 13 and the second user device 17 should have been recorded in the at least one first execution record 130 transmitted by the client module 139 of the first user device 13 and the at least one second execution record 170 transmitted by the client module 179 of the second user device 17.

Thus, according to the at least one first execution record 130 and the at least one second execution record 170 recorded in the recording list 1130 of the memory 113, the processing unit 115 of the server 11 can determine that the malware is copied from the first user device 13 to the second user device 17. Likewise, in a contrary situation, the processing unit 115 of the server 11 can determine that the malware is copied from the second user device 17 to the second user device 13 according to the at least one first execution record 130 and the at least one second execution record 170 recorded in the recording list 1130 of the memory 113.

In this way, the security protection as described in the previous embodiments can be accomplished by the server 11 on both the first user device 13 and the second user device 17 to deliver an effect of joint protection among a number of user devices.

Figure 5:
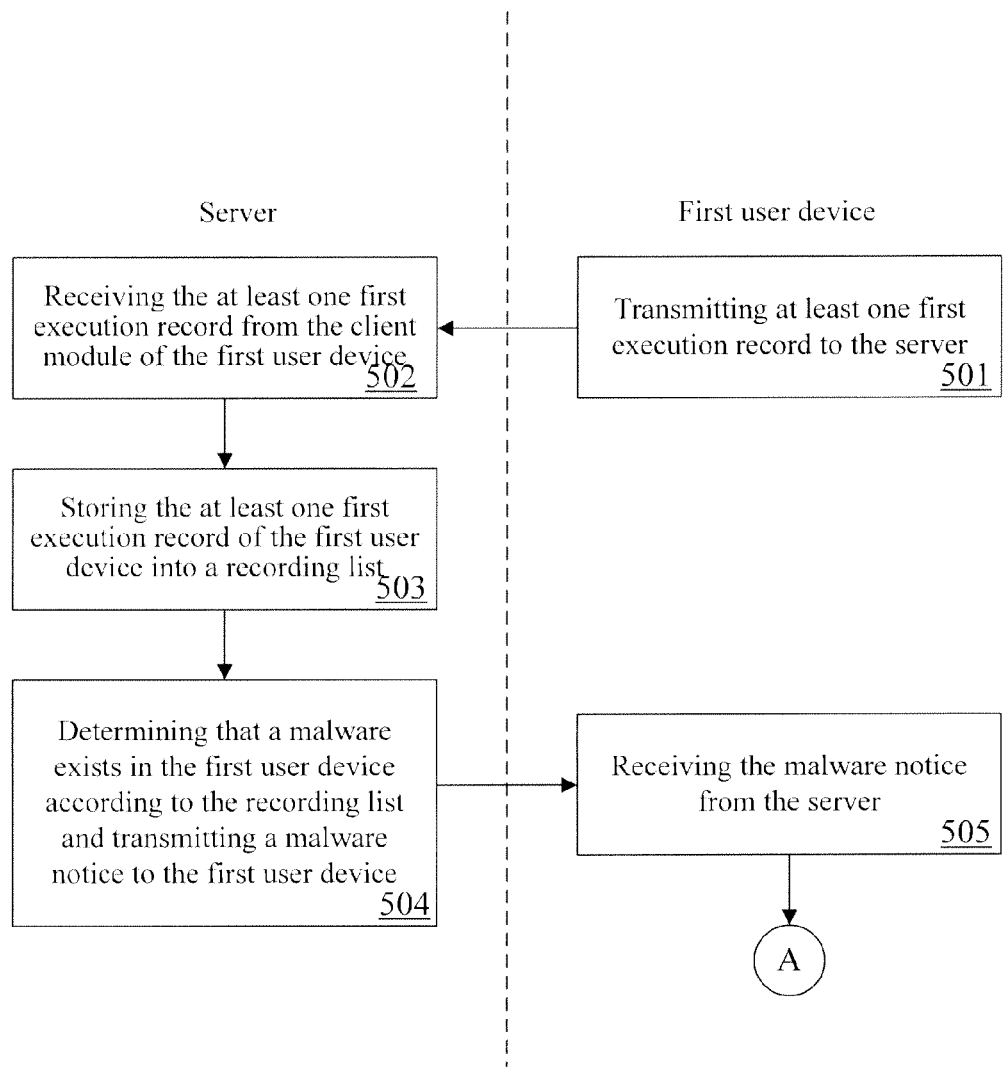
FIG. 5 is a flowchart of a malware detection method of a fifth embodiment of the present invention.

A fifth embodiment of the present invention is a malware detection method, a flowchart of which is shown in FIG. 5. The malware detection method of the fifth embodiment is adapted for a server and a first user device, e.g., the server 11 and the first user device 13 described in the previous embodiments. The server connects to the first user device via a network. Detailed steps of the fifth embodiment will be described as follows.

Step 501 is executed to enable a client module of the first user device to transmit at least one first execution record to the server. Then, step 502 is executed to enable the server to receive the at least one first execution record from the client module of the first user device, and step 503 is executed to enable the server to store the at least one first execution record of the first user device into a recording list. Next, step 504 is executed to enable the server to determine that a malware exists in the first user device according to the recording list and transmit a malware notice to the first user device. Finally, step 505 is executed to enable the client module of the first user device to receive the malware notice from the server. The malware notice is used to inform the first user device of existence of the malware in the first user device.

Also, it shall be particularly noted that, the process flow described above is not intended to limit the orders of recording the execution records and determining whether a malware exists in the user device or not. In more detail, taking the fifth embodiment as an example, the orders of the step 503, the step 504 and the step 505 may be swapped with each other. In other words, after the step 502 of enabling the server to receive the at least one first execution record from the client module of the first user device, step 504 may be executed at first to enable the server to determine whether the first user device has an improper behavior according to content of the at least one first execution record so as to determine that a malware exists in the first user device, and then the step 505 is executed to transmit the malware notice to the first user device. After completion of the determination, the step 503 is executed to enable the server to store the at least one first execution record into the recording list of the memory for use in subsequent determinations.

According to what described above, by using the server to monitor behaviors of the user device in real time, the malware detection method disclosed in the present invention can determine whether a malware exists in the user device so that subsequent processing can be made by the server for security protection.

Figure 6:
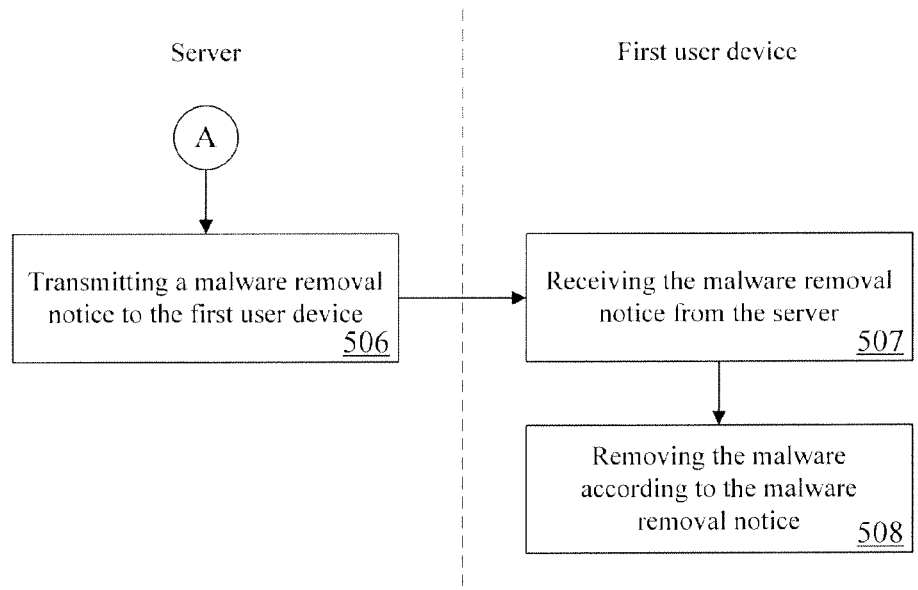
FIG. 6 is a flowchart of a malware detection method of a sixth embodiment of the present invention.

A sixth embodiment of the present invention is a malware detection method, a flowchart of which is shown in FIG. 6. It shall be particularly noted that, steps of determining a malware in the sixth embodiment are the same as the steps 501 to 505 described in the fifth embodiment, so they will not be detailed again herein. Hereinbelow, description of the sixth embodiment will focus on a way in which the subsequent security protection is accomplished.

In the sixth embodiment, after completion of the steps 501 to 505, step 506 is executed to enable the server to transmit a malware removal notice to the first user device. Then, step 507 is executed to enable the client module of the first user device to receive the malware removal notice from the server, and step 508 is executed to enable the client module of the first user device to remove the malware according to the malware removal notice. Thus, the malware existing in the first user device can be removed by the client module of the first user device to ensure security of subsequent behaviors.

Figure 7:
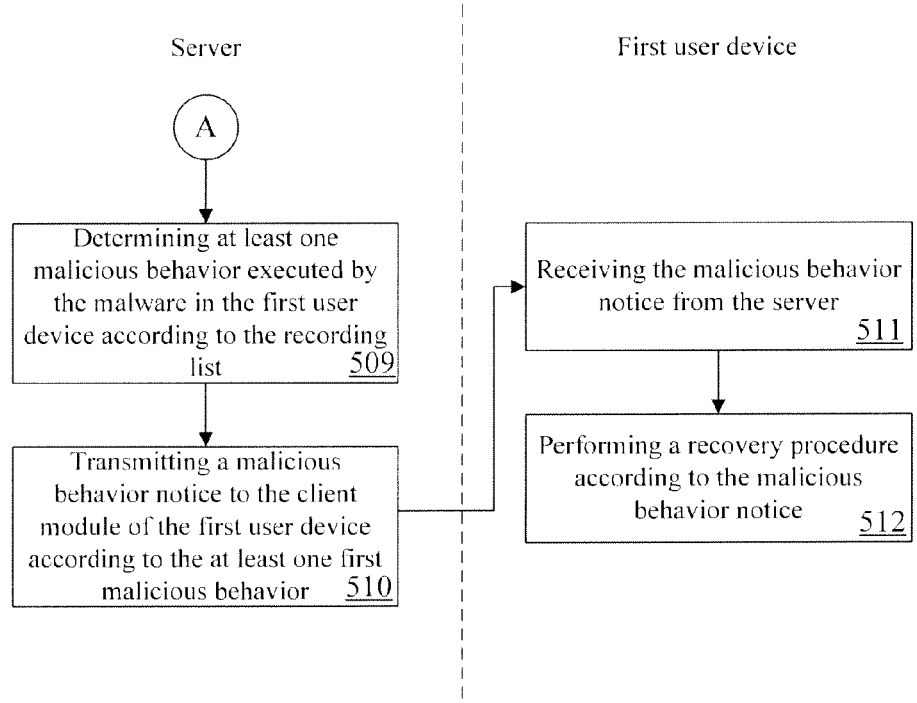
FIG. 7 is a flowchart of a malware detection method of a seventh embodiment of the present invention.

A seventh embodiment of the present invention is a malware detection method, a flowchart of which is shown in FIG. 7. It shall be particularly noted that, steps of determining a malware in the seventh embodiment are the same as the steps 501 to 505 described in the fifth embodiment, so they will not be detailed again herein. Hereinbelow, description of the seventh embodiment will focus on another way in which the subsequent security protection is accomplished.

In the seventh embodiment, after completion of the steps 501 to 505, step 509 is executed to enable the server to determine at least one malicious behavior executed by the malware in the first user device according to the recording list. Then, step 510 is executed to enable the server to transmit a malicious behavior notice to the client module of the first user device according to the at least one first malicious behavior, and step 511 is executed to enable the client module of the first user device to receive the malicious behavior notice from the server. Finally, step 512 is executed to enable the client module of the first user device to perform a recovery procedure according to the malicious behavior notice.

In the way described in the seventh embodiment, the first user device can know about actions that have been made by the malware so as to perform a subsequent procedure for alteration or recovery accordingly.

Figure 8:
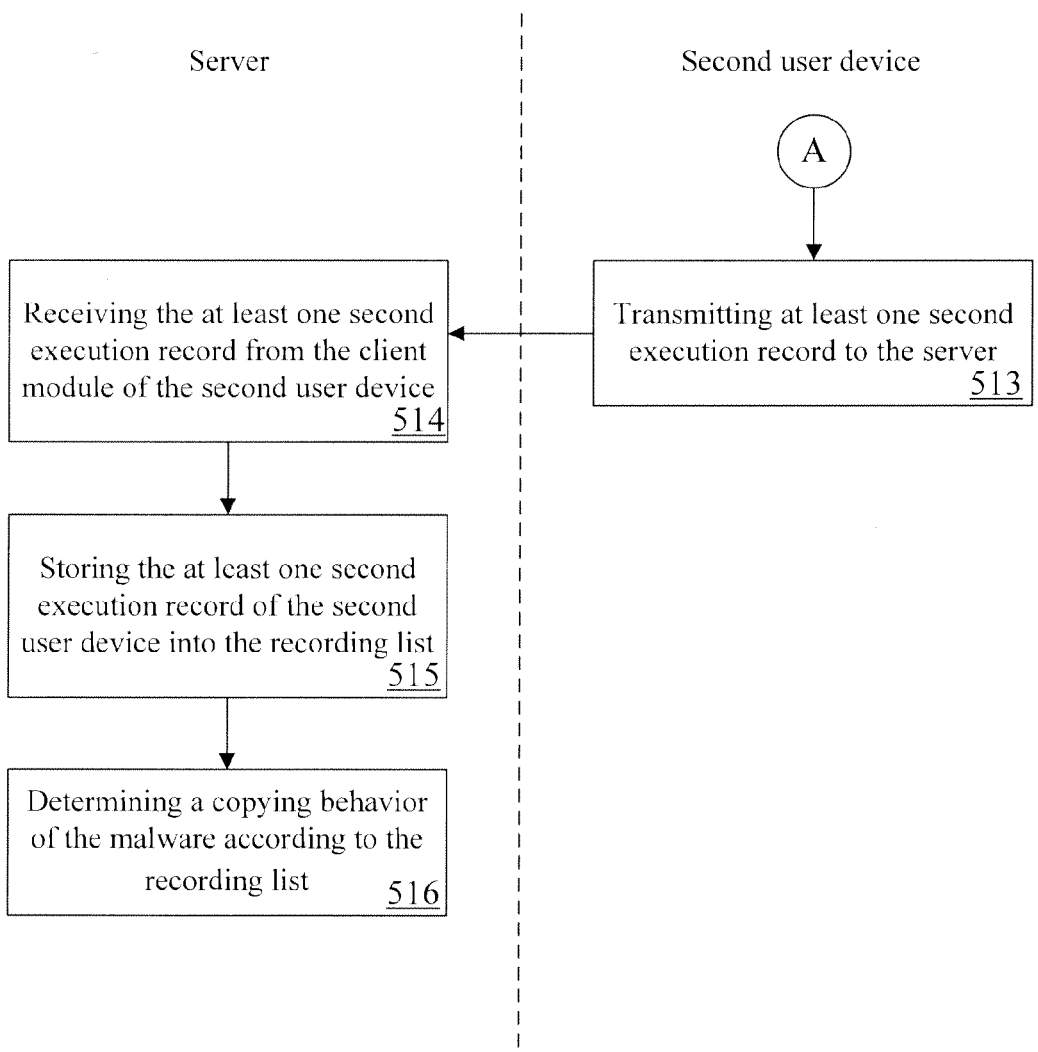
FIG. 8 is a flowchart of a malware detection method of an eighth embodiment of the present invention.

An eighth embodiment of the present invention is a malware detection method, a flowchart of which is shown in FIG. 8. It shall be particularly noted that, steps of determining a malware in the eighth embodiment are the same as the steps 501 to 505 described in the fifth embodiment, so they will not be detailed again herein. In the eighth embodiment, how joint security protection among a number of user devices is accomplished will be described. In the eighth embodiment, the server further connects to a second user device (e.g., the second user device 17 described in the previous embodiments) via the network. Steps of the eighth embodiment will be detailed as follows.

In the eighth embodiment, after completion of the steps 501 to 505, step 513 is executed to enable a client module of the second user device to transmit at least one second execution record to the server. Then, step 514 is executed to enable the server to receive the at least one second execution record from the client module of the second user device, and step 515 is executed to enable the server to store the at least one second execution record of the second user device into the recording list. Finally, step 516 is executed to enable the server to, according to the recording list, determine that the malware is copied from the first user device to the second user device or vice versa.

It shall be particularly noted that, the time point at which the second user device transmits the at least one second execution record is not limited to be subsequent to transmission of the at least one first execution record by the first user device. In more detail, the eighth embodiment is primarily intended to emphasize that the server can record execution records of both the first user device and the second user device and, accordingly, determine whether there is any connection in terms of malwares between the two user devices. Therefore, the time point at which the second user device transmits the at least one second execution record may also be ahead of transmission of the at least one first execution record by the first user device. Thereby, in the way described above, the security protection as described in the previous embodiments can be accomplished by the server on both the first user device and the second user device to deliver an effect of joint protection among a number of user devices.

According to the above descriptions, the server, the user device and the malware detection method of the present invention can effectively provide a second protection barrier in case the antivirus software fails to detect a virus; moreover, according to the history of execution records, the server can help the user device to perform subsequent protection and repair procedures. Thereby, information security protection becomes more complete for the user device.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A malware detection method for a server, the server connecting to a first user device and a second user device via a network, the malware detection method comprising the following steps of:
(a) enabling the server to receive at least one first execution record from a client module of the first user device;
(b) enabling the server to store the at least one first execution record of the first user device into a recording list;
(c) enabling the server to determine that a malware exists in the first user device according to the recording list, and transmit a malware notice to the first user device;
(d) enabling the server to receive at least one second execution record from a client module of the second user device;
(e) enabling the server to store the at least one second execution record of the second user device into the recording list; and
(f) enabling the server to determine whether the malware is copied from the first user device to the second user device or copied from the second user device to the first user device according to the recording list.

2. The malware detection method as claimed in claim 1, further comprising the following step after step (c):
(c1) enabling the server to transmit a malware removal notice to the client module of the first user device so that the client module of the first user device removes the malware.

3. The malware detection method as claimed in claim 1, further comprising the following steps after step (c):
(c1) enabling the server to determine at least one malicious behavior executed by the malware in the first user device according to the recording list; and
(c2) enabling the server to transmit, according to the at least one malicious behavior, a malicious behavior notice to the client module of the first user device so that the client module of the first user device performs a recovery procedure.

4. A server for detecting a malware, the server connecting to a first user device and a second user device via a network and comprising:
a transceiver, being configured to receive at least one first execution record from a client module of the first user device;
a memory, being configured to store a recording list that is configured to record the at least one first execution record; and
a processing unit, being configured to determine that a malware exists in the first user device according to the recording list and transmit a malware notice to the first user device via the transceiver;
wherein the transceiver is further configured to receive at least one second execution record from a client module of the second user device, the recording list of the memory is further configured to record the at least one second execution record, and the processing unit is further configured to determine whether the malware is copied from the first user device to the second user device or copied from the second user device to the first user device according to the recording list.

5. The server as claimed in claim 4, wherein the processing unit is further configured to transmit a malware removal notice to the client module of the first user device via the transceiver so that the client module of the first user device removes the malware.

6. The server as claimed in claim 4, wherein the processing unit is further configured to determine at least one malicious behavior executed by the malware in the first user device according to the recording list stored in the memory and, according to the at least one malicious behavior, transmit a malicious behavior notice to the client module of the first user device via the transceiver so that the client module of the first user device performs a recovery procedure.

7. A malware detection method for a user device, the user device connecting to a server via a network, the malware detection method comprising the following steps of:
(a) enabling a client module of the user device to transmit at least one execution record to the server;
(b) enabling the client module of the user device to, after step (a), receive a malware notice from the server, wherein the malware notice is used to notice that a malware exists in the user device;,
(c) enabling the client module of the user device to receive a malware removal notice from the server; and
(d) enabling the client module of the user device to remove the malware according to the malware removal notice.

8. A user device for detecting a malware, the user device connecting to a server via a network and comprising:
a transceiver; and
a client module, being configured to transmit at least one execution record to the server via the transceiver and receive a malware notice from the server via the transceiver, wherein the malware notice is used to notice that a malware exists in the user device and wherein the client module is further configured to receive a malware removal notice from the server via the transceiver, and remove the malware according to the malware removal notice.

* * * * *